United States Patent [19]

Gopinath et al.

[11] Patent Number: 4,768,189

[45] Date of Patent: Aug. 30, 1988

[54] HIGH CAPACITY COMMUNICATION UTILIZING STATIC, OR-TYPE CHANNELS

[75] Inventors: Bhaskarpillai Gopinath, Berkeley Heights; Shuo-Yen R. Li, Gillette, both of N.J.

[73] Assignee: Bell Communications Research, Inc., Livingston, N.J.

[21] Appl. No.: 62,945

[22] Filed: Jun. 17, 1987

[51] Int. Cl.$^4$ ............................................. H04L 5/00
[52] U.S. Cl. .................................... 370/85; 340/825.5
[58] Field of Search ................. 370/85, 89; 340/825.5, 340/825.51

[56] References Cited

U.S. PATENT DOCUMENTS

| | | | |
|---|---|---|---|
| 3,796,992 | 3/1974 | Nakamura et al. | 340/147 |
| 4,253,179 | 2/1981 | Shimizu | 370/85 |
| 4,281,380 | 7/1981 | DeMesa III et al. | 364/200 |
| 4,359,731 | 11/1982 | Beauford et al. | 340/825.51 |
| 4,376,278 | 3/1983 | Jacobsthal | 340/825.5 |
| 4,470,110 | 9/1984 | Chiarottino et al. | 364/200 |
| 4,476,467 | 10/1984 | Terwilliger et al. | 340/825.5 |
| 4,481,626 | 11/1984 | Boggs et al. | 379/85 |
| 4,569,046 | 2/1986 | Hadziomerovic et al. | 370/85 |
| 4,715,031 | 12/1987 | Crawford et al. | 370/85 |
| 4,719,458 | 1/1988 | Miesterfeld et al. | 370/85 |

FOREIGN PATENT DOCUMENTS

| | | | |
|---|---|---|---|
| 0195036 | 8/1986 | Japan | 370/85 |
| 1365838 | 9/1974 | United Kingdom . | |

OTHER PUBLICATIONS

John Gosch, "Two Buses Organize the Electronic Home", Electronics (USA), vol. 54, No. 19, Sep. 22, 1981, pp. 76–78.

*Primary Examiner*—Douglas W. Olms
*Assistant Examiner*—Melvin Marcelo
*Attorney, Agent, or Firm*—James W. Falk; John T. Peoples

[57] ABSTRACT

Methodology and associated circuitry (131,141–143, 151,152,161,162,171–174,181) are disclosed for achieving contention-free broadcasting over one or more buses interconnecting a plurality of synchronized stations. In broad terms for the multiple bus case, each station that intends to utilize the buses prepares candidate message frames equalling the number of buses. The first candidate message of each station (301), after a first perturbation, is propagated over the first bus (311); also, the second candidate message of each station (302), after a second perturbation, is propagated over the second bus (312); this process occurs for all buses. Then, any station detecting a mismatch between its most recently propagated bit on a particular bus and the state of that bus deactivates further propagation of the candidate message on that bus. To arrive at the correct candidate message revealed by each bus, the inverse of the original perturbation must be applied to the revealed message. Examples of perturbations include an EXCLUSIVE-OR operation with randomly generated numbers, cyclic shift operation, cyclic inversion operation and linear transformation.

8 Claims, 9 Drawing Sheets

| MAP FUNCTION | FRAME | ACTIVE IMAGES | LINE | REVEALED IMAGES | REVEALED FRAME |
|---|---|---|---|---|---|
| FUNCTION 1 | S1: 1 0 0 0 1<br>S2: 0 0 0 1 0<br>S3: 0 0 1 0 1<br>S4: 0 1 1 1 1<br>S5: 1 0 1 1 1 | 1 0 1 1 1<br>1 1 0 0 1<br>1 1 1 0 0<br>1 1 1 0 0<br>1 1 0 0 0 | 411 | 1 1 0<br>1 1 1 0<br>1 1 1 0<br>1 1 0 0 0 | 0 0 1 0 |
| FUNCTION 2 | S1: 1 0 0 0 1<br>S2: 0 0 0 1 1<br>S3: 0 0 1 1 1<br>S4: 0 1 0 1 1<br>S5: 1 1 1 1 1 | 0 1 0 1 0<br>0 1 0 1 0<br>0 0 1 1 0 0<br>0 0 1 1 0 1<br>0 0 1 1 0 1 | 412 | 0 1 1 0<br>0 0 1 1 0<br>0 0 1 1 0 | 0 1 1 0 |
| FUNCTION 3 | S1: 1 0 0 0 1<br>S2: 0 0 1 1 1<br>S3: 0 0 1 0 1<br>S4: 0 1 0 1 1<br>S5: 1 1 1 1 1 | 0 1 1 0 0<br>0 1 1 0 0<br>0 1 1 0 1 1 0<br>0 1 0 0 1 1 0<br>0 1 0 0 1 1 | 413 | 0 1 1 0<br>0 0 1 1 0<br>0 0 1 1 1 | 1 0 1 0 |
| FUNCTION 4 | S1: 1 0 0 0 1<br>S2: 0 0 1 1 1<br>S3: 0 0 1 0 1<br>S4: 0 1 0 1 1<br>S5: 1 1 1 1 1 | 0 1 0 1 1<br>0 1 0 1 1<br>1 0 1 0 0 1 1<br>1 0 1 0 0 1 1<br>1 1 0 0 1 1 | 414 | 1 0<br>1 1 0<br>1 0 0<br>1 1 1 1 | 1 1 1 1 |

FIG. 9

HIGH CAPACITY COMMUNICATION UTILIZING STATIC, OR-TYPE CHANNELS

FIELD OF THE INVENTION

This invention relates generally to a multiple access communication system wherein one or more channels interconnect a plurality of stations and, more specifically, to methodology and circuitry for effecting high capacity, contention-free interstation communication.

BACKGROUND OF THE INVENTION

Many communication systems have a configuration characterized by a plurality of stations interconnected by a common transmission channel, and information interchange among the stations occurs on a time-shared basis over the channel. In these systems, conflicts may arise whenever two or more stations simultaneously request use of the channel for transmission.

For these so-called contention situations, methods and concomitant arrangements exist for dealing with conflicts and these vary in complexity from simple, fixed priority techniques to sophisticated code division multiple access procedures.

In general terms, a contention period comprises: a duration wherein a plurality of stations submit requests for allocation of the channel; an interval to detect the multiple requests; and a duration to resolve the conflict and allocate the channel to the selected station. During the contention period, no actual or message-bearing communication may occur, thereby resulting in reduced utilization of channel capacity. From another viewpoint, if a normalized efficiency per transmission period is defined as the ratio of the time utilized for information-bearing message transfer to the total time period, then the efficiency is generally less than one for conventional contention resolving systems.

As a specific example of a technique for arbitrating contentions, the Carrier Sense Multiple Access with Collision Detection (CSMA/CD) media access method is briefly described; it is considered illustrative of the more sophisticated contention resolution methods. (The CSMA/CD method is discussed in detail in the text entitled "Carrier Sense Multiple Access with Collision Detection (CSMA/CD) Access Method and Physical Layer Specifications", published by The Institute of Electrical and Electronic Engineers, Inc. in 1985). To transmit, each station monitors for a quiet period on the channel by detecting that no other stations are transmitting, and then emits the intended message in bit-serial form. If, after commencing transmission, the message collides with that of other stations, then each transmitting station intentionally sends additional bits to ensure propagation of the collision throughout the system. The stations then deactivate for a random time period, called the backoff time, before attempting to transmit again. This process continues until only a single message propagates collision-free over the channel. However, as is discernible even from this brief overview, this technique is somewhat inefficient due to station deactivation during the backoff periods and the random nature of the retry process.

Other, more specialized techniques have been disclosed to deal with contention on a more deterministic basis. Representative of these techniques are the disclosures in U.S. Pat. No. 3,796,992 and Great Britain Pat. No. 1,365,838.

In Great Britain Pat. No. 1,365,838, the particular system considered is one in which a number of data handling devices (slave stations) are in communication with a common controller (master station) over a bus and any one of the devices may require service from the controller at any given time. At system initialization, each data handling device is assigned a fixed interrupt number indicative of the device address. The controller solicits interrupt requests by transmitting a coded message. Each device, if requesting use of the bus, responds by serially transmitting its interrupt number simultaneously with other devices. Then each device compares the bus content bit-by-bit and dynamically either terminates or continues its transmission according to the results of the comparison. With such a technique, the time required to resolve a contention is fixed by the number of bits assigned to the interrupt numbers. However, even though this time is deterministic, there is still a period in which no actual information-bearing messages may be transmitted and the normalized efficiency is less than one.

None of the conventional techniques disclose or suggest a methodology for always achieving the optimum normalized efficiency as defined above. Moreover, none of the known methods suggest the utilization of more than one channel or bus to resolve or even eliminate contention situations.

SUMMARY OF THE INVENTION

The above disadvantages and other limitations of conventional, single-channel contention resolution methods and arrangements are obviated in the accordance with the present invention by utilizing all bits from each frame period to convey information-bearing messages.

In broad terms for the single-channel case, each station prepares a candidate frame message from information processed by the station. All stations having a candidate message propagate these candidate messages synchronously over the channel or bus, thereby contributing to the composite state of the bus. Each station also monitors the bus state and whenever a mismatch between the individual contribution and the composite bus state is detected, the stations with mismatches discontinue propagation for the remainder of the frame. In this manner, the unfolding bus state is equivalent to one of the candidate messages. If multiple stations have the identical candidate message and this message is the one revealed by the bus at the end of the frame, then all of these multiple stations have, in effect, broadcast their messages. It is a feature of this method that two or more stations may be active during each frame, each propagating the identical message, and there is no requirement to resolve contentions among the stations.

The basic method of the single-channel case may be extended, in accordance with the present invention, to a plurality of lines interconnecting the stations. In broad terms for the two-channel case, each station prepares two candidate messages per frame—one for each channel—from information undergoing processing by the station. All stations having candidate messages synchronously propagate them over the first channel, and the complements of the candidate messages are propagated over the second channel. Each channel is then treated as the single-channel case and any station detecting a mismatch deactivates further propagation of the message producing the mismatch. In general, any candidate message revealed by the state of one channel is never simultaneously revealed by the second channel, thereby allowing another candidate message to propagate over the second channel. It is a feature of this two-channel method that two or more stations may be active on each channel for each frame without the need to resolve contentions among the stations.

In broad terms for the case of more than two channels, each station that intends to use the lines prepares, per frame, candidate messages equal to the number of lines from information being produced by the station. These candidate messages are not necessarily all distinct. The first candidate message of each station, after a first perturbation, is propagated over the first line; also, the second candidate message of each station, after a second perturbation, is propagated over the second line; this process continues for all lines. Then each line is treated as a single-line case and any station detecting a mismatch deactivates further propagation of the candidate message involving the mismatch. To arrive at the correct candidate message revealed by each line, the inverse of the original perturbation must be applied to the revealed message. Examples of perturbations include an EXCLUSIVE-OR operation with randomly generated numbers, cyclic shift operation, cyclic inversion operation and linear transformation.

Although the foregoing invention summary was couched in terms of interstation communication, the basic principles may also be used for the purpose of allocating resources in a computer system.

The organization and operation of the invention will be better understood from a consideration of the detailed description of the illustrative embodiments thereof, which follow, when taken in conjunction with the accompanying drawing.

BRIEF DESCRIPTION OF THE DRAWING

FIG. 5 is an arrangement of data which summarizes the various frame messages and the random numbers generated during processing by the system of FIG. 4;

FIGS. 7 and 8 are arrangements of data which summarize the various frame messages occurring during cyclic shift and cyclic inversion processing, respectively, by the system of FIG. 6; and FIG. 9 is an arrangement of data which summarizes the various frame messages occurring during the linear transformation processing by the system of FIG. 6.

DETAILED DESCRIPTION

For clarity of exposition, it is helpful initially to provide a hueristic basis for the fundamental concepts of the present invention. The basis exemplifies an illustrative embodiment of one aspect of the present invention and introduces foundational concepts and terminology which facilitate later presentation of other illustrative embodiments.

1. Heuristic Basis

Figure 1:
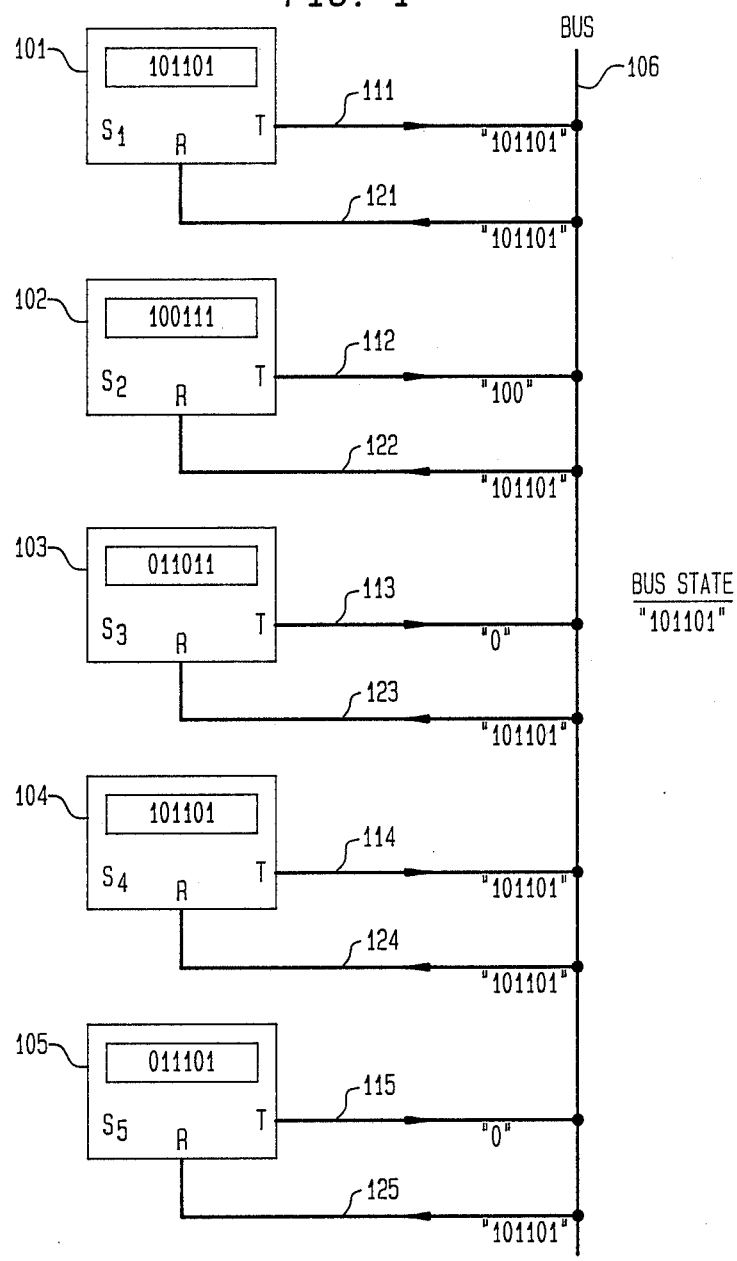
FIG. 1 is a representation of a multiple access communication system wherein a single channel interconnects numerous, geographically-dispersed stations.

With reference to FIG. 1, a multiple access communication system is considered wherein single transmission medium 106 (also called a channel, line or bus), such as a fiber optic cable, interconnects numerous geographically-dispersed stations, generally designated $S_1$, $S_2$, . . ., $S_k$. For specificity, it is supposed that the system is composed of five stations $S_1$, $S_2$, $S_3$, $S_4$ and $S_5$, as depicted in FIG. 1 by elements 101 through 105, respectively. Each station generates messages independently of the other stations, although the overall system is presumed to be in synchronism. Messages are transmitted by each station in the form of contiguous message frames with each frame comprising a fixed number of bit positions in which a pattern of "1"s and "0"s is transmitted. Again, for specificity during this discussion, it is presumed that each frame comprises six bit positions. With the focus now on one particular frame, it is further assumed that each station has a six-bit candidate message to transmit onto bus 106 via broadcast leads 111 through 115, respectively. This represents the maximum load on the system since all stations are prepared to reveal a message. An exemplary candidate message frame for each station is presented in Table I and depicted within each station of FIG. 1 as follows:

TABLE I

| Station | Bit Position | | | | | |
|---|---|---|---|---|---|---|
| | 1 | 2 | 3 | 4 | 5 | 6 |
| $S_1$ | 1 | 0 | 1 | 1 | 0 | 1 |
| $S_2$ | 1 | 0 | 0 | 1 | 1 | 1 |
| $S_3$ | 0 | 1 | 1 | 0 | 1 | 1 |
| $S_4$ | 1 | 0 | 1 | 1 | 0 | 1 |
| $S_5$ | 0 | 1 | 1 | 1 | 0 | 1 |

It is also assumed for this example that bus 106 is arranged as an OR bus, that is, two or more "1" bits placed simultaneously on the bus result in a "1" on the bus for that particular bit position. Moreover, the bus is considered to be nondirectional, that is, all propagating "1"s and "0"s settle within the initial time portion of a bit duration and steady-state is achieved before the stations monitor the bus state. With reference to Table I, since stations $S_1$, $S_2$ and $S_4$ each place a "1" on the bus in the first bit position, the bus state is "1". Since all stations are arranged to monitor the state of the bus via receive leads 121 through 125, respectively, during a frame, $S_3$ and $S_5$ sense the "1" on the bus and deactivate transmission, but not monitoring, for the remainder of the frame. Deactivation of these two stations occurs because each placed a "0" on the bus so neither could have changed the bus state to "1". In general, a station deactivates if the bus state is different from the bit that was transmitted by the station.

Since $S_1$, $S_2$ and $S_4$ are still active for the second bit position, each places its respective second bit on the bus. Each station transmits a "0", so the bus state is "0". Because the bus state is the same as the bit broadcast by each active station, $S_1$, $S_2$ and $S_4$ all remain active for the broadcasting of the bits in the third bit position. The state of the bus after the third bit from each active station is placed on the bus is "1". Since $S_2$ transmitted a "0" in this position, broadcasting by $S_2$ is deactivated.

Now only $S_1$ and $S_4$ place their fourth bit on the bus resulting in a bus state of "1". Since each placed this bit on the bus, both remain active for transmission of the fifth bit. After the fifth bits from $S_1$ and $S_4$ are transmitted, the bus state is "0". Again, since each placed this bit on the bus, both continue as active.

Finally, transmission of the sixth bits results in a bus state of "1". Since $S_1$ and $S_4$ each transmitted a "1", both remain active.

A summary of the bus state during the transmission of this frame produces the message 101101. This message is identical to the messages broadcast by $S_1$ and $S_4$. Consequently, $S_1$ and $S_4$ have transmitted their messages simultaneously and $S_2$, $S_3$ and $S_5$, which are continually monitoring the bus even though they are deactivated from transmitting, receive the broadcast message 101101. Table II presents a pictorial summary of the station deactivation. An "X" entry in Table II indicates that a station deactivates its message transmission for the remainder of the frame.

TABLE II

| Station | Bit Position | | | | | |
|---|---|---|---|---|---|---|
| | 1 | 2 | 3 | 4 | 5 | 6 |
| $S_1$ | | | | | | |
| $S_2$ | | | X | | | |
| $S_3$ | X | | | | | |
| $S_4$ | | | | | | |
| $S_5$ | X | | | | | |

Since $S_1$ and $S_4$ do not have an "X" entry, these are the active stations at the end of the frame and their messages define the bus state for this particular frame.

With the conventional collision or contention arrangements discussed in the Background Section, the efficiency of those arrangements for the message frames of this example would be somewhat less than one because there would be a contention period and then only one of the two identical messages would be broadcast. In this example, the efficiency is 2, that is, twice the normalized optimum efficiency. In fact, the efficiency of this transmission arrangement in accordance with the present invention is always $\geq 1$.

By way of devising terminology for later reference, it is said that stations $S_1$ and $S_4$ "won" control of the bus, whereas the remaining stations "lost" control of the bus. This terminology is useful in describing a new situation in which more than one bus interconnects the stations. The general case is the so-called L-bus case or L-line case; illustrative embodiments for the L-line arrangements are discussed in the sections that follow.

Figure 2:
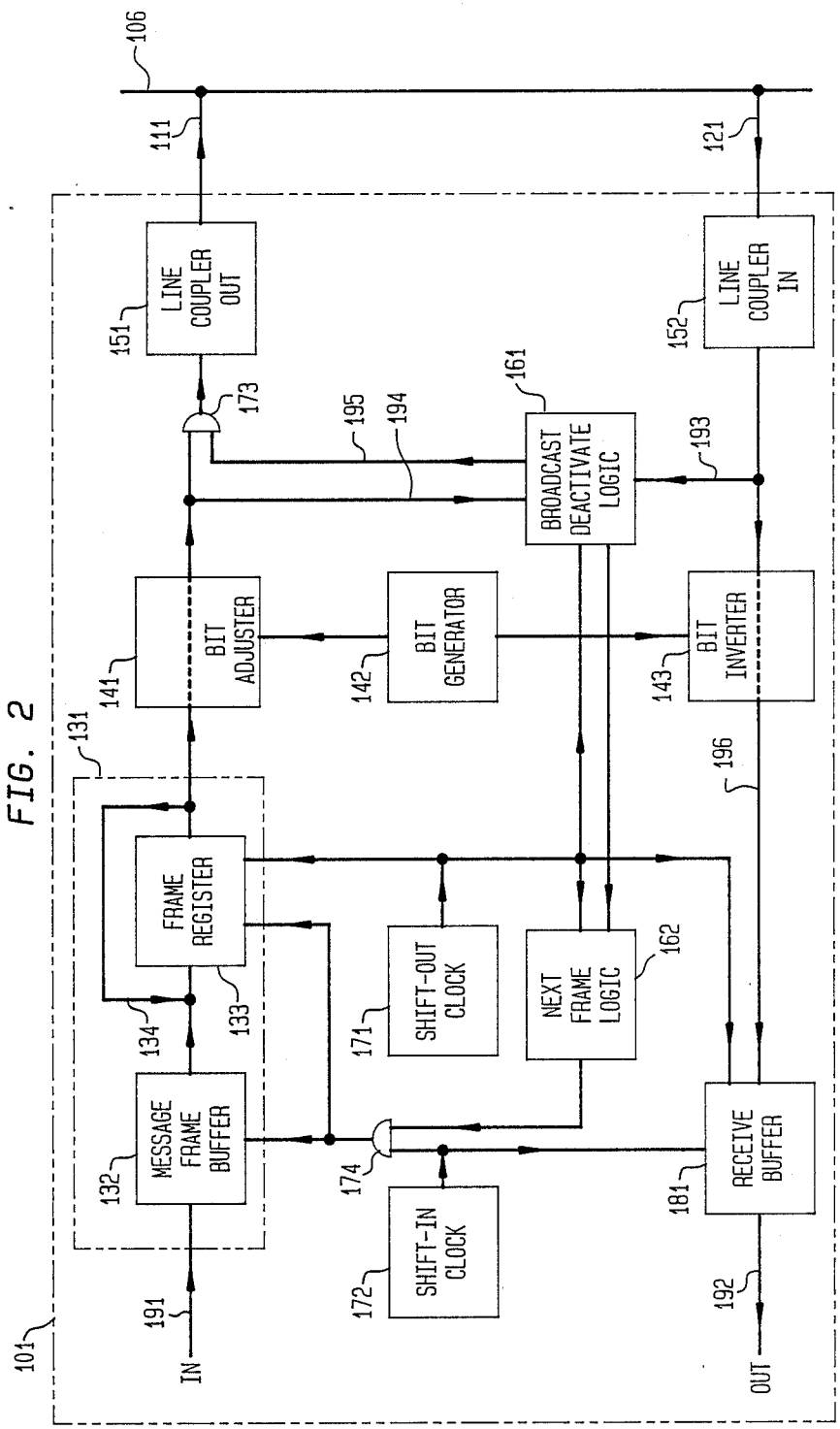
FIG. 2 is a circuit diagram illustrative of a station from FIG. 1 configured to implement the single channel methodology in accordance with the present invention.

An illustrative embodiment representative of each station from FIG. 1 is shown in FIG. 2 specifically for station 101. Input data is provided on lead 191 to message buffer 132, which partitions and stores the data into fixed-length message frames (six bit positions in the example). The frame serving as a candidate for transmission over bus 106 is stored in frame register 133, which receives its input from buffer 132 under control of shift-in clock 172, next frame logic 162 and AND gate 174. Basically, logic 162 outputs a logic 1 if the station remains active for the duration of a frame, thereby indicating the successful broadcasting of the candidate frame. Logic 162 is responsive to broadcast deactivate logic 161, which monitors, via coupler 152 and lead 193, each bit broadcast on bus 106. Logic 161 also monitors the output of bit adjuster 141 via lead 194.

In the present example, adjuster 141 is merely a straight-through connection (shown dashed in FIG. 2). Other embodiments of adjuster 141 will be discussed later. Whenever the bits on leads 194 and 193 do not match, logic 161 outputs an inhibit signal to AND gate 173, via lead 195, for the duration of the frame. In this way, the bits from adjuster 141 will not be transmitted to bus 106 via gate 173 and coupler 151 after the first occurrence of a frame bit differing from the bus state. The frame bits are recirculated via lead 134 to register 133 for retransmission in the event an inhibit occurs. The timing of logic 161 and 162 and register 133 is under control of shift-out clock 171, which operates at the bit transmission rate of bus 106. Clock 171 also serves as an input to receive buffer 181 along with the signal on lead 196 from bit inverter 143. Buffer 181 accumulates the bus state of the frame, and this state is transmitted as output data on lead 192. Bit inverter 143, shown interposed between line coupler 152 and buffer 181, is merely a straight-through connection in this embodiment. In later embodiments its operation will be discussed.

Bit generator 142, although shown in FIG. 2, is not required whenever adjuster 141 merely interconnects register 133 with gate 173. Its operation will be discussed with the other illustrative embodiments of adjuster 141.

Frame buffer 132, register 133 and recirculation lead 134 have been shown collectively as element 131. It is to be understood that any device effecting the same operations of the enclosed devices can serve as element 131. For instance, element 131 may comprise a RAM device and the frame to be transmitted is identified by a pointer to a memory address. A nondestructive read-out of the contents of an address serves the recirculation function and a pointer adjustment identifies the candidate frame.

2. Illustrative Embodiment of the OR, Static 2-Line Case

Figure 3:
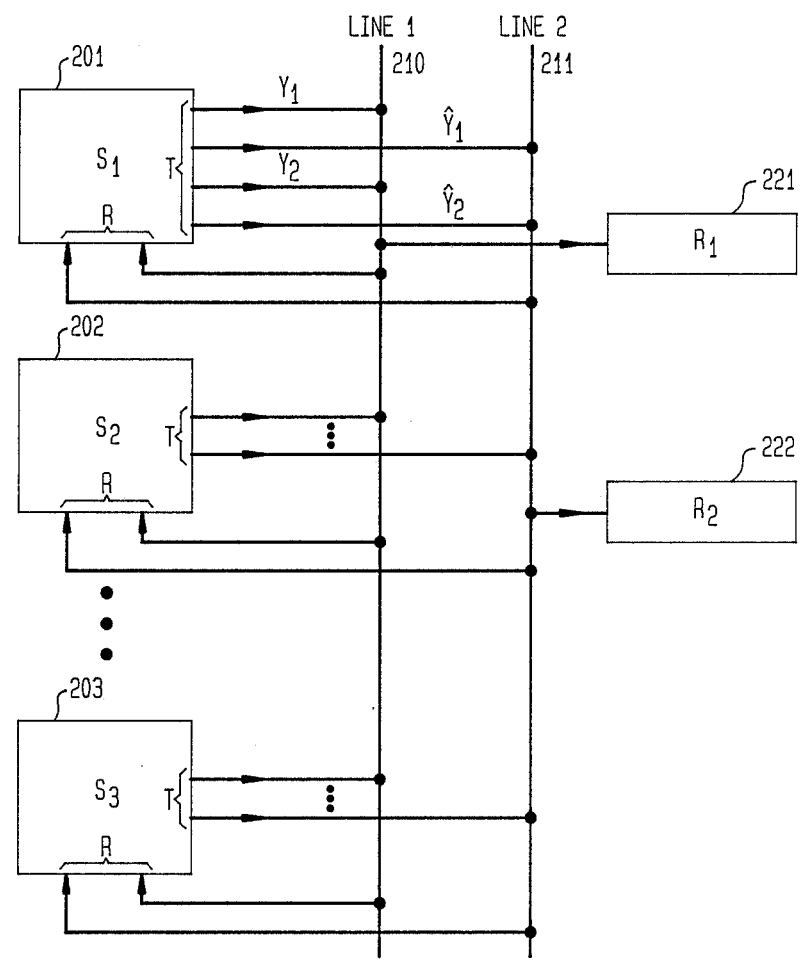
FIG. 3 is a representation of a multiple access communication system wherein two channels interconnect numerous, geographically-dispersed stations.

This case is discussed with reference to FIG. 3. Each station $S_1$, $S_2$, ..., $S_K$ (elements 201, 202, ..., 203, respectively) is prepared to reveal two different messages. Focusing on station $S_1$, its two messages are designated $y_1$ and $y_2$. Initially, $y_1$ is placed on first bus 210 and the complement of $y_1$, designated $\hat{y}_1$, is placed on second bus 211. Similarly, $y_2$ is placed on bus 210 and $\hat{y}_2$ is placed on bus 211. If $y_1$ wins on the first bus, its complement automatically loses on the second bus. Similarly, if $y_2$ wins on the first bus, $\hat{y}_2$ loses on the second bus. In this way, neither message can control both busses so one or the other or both messages may be concurrently transmitted when each bus is analyzed as a stand-alone bus as presented in the previous section. Thus, receivers $R_1$ and $R_2$ (elements 221 and 221, respectively), connected to busses 210 and 211, respectively, detect the two frames having the most and least significant values (that is, if the bits in a message frame are expressed in terms of their binary representation, the highest and lowest value messages are the frames received). For example, if the data encoded within message frames represents time data in binary form, then the detected frames would represent the latest time and oldest time, respectively. In this way, data is automatically time stamped and there is no need to transmit additional information to resequence messages in time.

With respect to terminology, the arrangement wherein each line of the L-line case is treated as a one-line case is the so-called static arrangement.

With respect to an illustrative embodiment of station 201, 202 or 203, it is clear that the circuitry of FIG. 2 can easily be modified to yield such an embodiment. For instance, for station 201, the circuitry of FIG. 2 would serve to broadcast $y_1$. Moreover, a replicated version of FIG. 2, where the data input on lead 191 is the complement of the data provided for $y_1$ and the data output on lead 192 is complemented before delivery, could serve to broadcast $\hat{y}_1$. Additionally, a communication path between the replicated sections is added to indicate if either $y_1$ or $\hat{y}_1$ was received, thereby establishing a successful broadcast of the candidate frame or its complement. FIG. 3 also depicts an added degree of freedom to the communication system in that stations 201–203 are designated as master stations and receivers 221 and 222 are slave stations. Slave stations are not required to broadcast or transmit, but merely monitor the bus state.

It is also to be understood that each station 201, ..., or 203 prepared two candidate messages per frame, namely, $y_1$ and $y_2$, and both were placed on single line 210. In the general case of L lines, $L>2$, discussed in the following sections, the strategy changes so that each station prepares, at most, one candidate message per frame. This message, upon appropriate transformation, is propagated over all L lines. Generally, if it wins on a line, it loses on all others.

3. Illustrative Embodiment of the OR, Static, Random L-Line Case

The principles of the present invention as applied to this case can readily be elucidated by considering a specific example. In particular, with reference to FIG. 4, five stations $S_1$–$S_5$ (elements 301–305) utilize four lines 311–314 to transmit message frames. Besides the five master stations 301–305, four slave receivers 321–324, connected to lines 311–314, respectively, are also arranged to detect the broadcasted messages.

The message frames considered for this example are the same ones listed in Table I above. Specifically, the message frame for station 301 is "101101". This frame message serves as one input to four separate EXCLUSIVE OR gates 351–354 in station 301. The other input to each of gates 351–354 is supplied by random number generators $R_1$–$R_4$ (elements 361–364), respectively. The outputs of gates 351–354, called the active image frames, are connected to lines 311–314, respectively, via transmit leads 331–334. The random sequence generated by each generator 361, 362, ..., or 364 is known to each station 301–305 and each receiver 321–324.

Table III lists specific random frame bits produced by random generators 361–364 for this particular example and Table IV lists the active image frames corresponding to the "101101" message frame.

TABLE III

| Generator | Bit Position | | | | | |
|---|---|---|---|---|---|---|
| | 1 | 2 | 3 | 4 | 5 | 6 |
| $R_1$ | 1 | 1 | 0 | 0 | 0 | 1 |
| $R_2$ | 1 | 0 | 1 | 0 | 1 | 0 |
| $R_3$ | 0 | 1 | 1 | 0 | 1 | 0 |
| $R_4$ | 0 | 0 | 0 | 1 | 0 | 1 |

TABLE IV

| Active Image | Bit Position | | | | | |
|---|---|---|---|---|---|---|
| | 1 | 2 | 3 | 4 | 5 | 6 |
| $S_1 \oplus R_1$ | 0 | 1 | 1 | 1 | 0 | 0 |

TABLE IV-continued

| Active Image | Bit Position | | | | | |
|---|---|---|---|---|---|---|
| | 1 | 2 | 3 | 4 | 5 | 6 |
| $S_1 \oplus R_2$ | 0 | 0 | 0 | 1 | 1 | 1 |
| $S_1 \oplus R_3$ | 1 | 1 | 0 | 1 | 1 | 1 |
| $S_1 \oplus R_4$ | 1 | 0 | 1 | 0 | 0 | 0 |

In order to determine which station wins on each line 311–314, the active images for the remaining stations must also be considered. Focusing initially on line 311, Table V lists the active images broadcast by stations 301–305.

TABLE V

| Active Image | Bit Position | | | | | |
|---|---|---|---|---|---|---|
| | 1 | 2 | 3 | 4 | 5 | 6 |
| $S_1 \oplus R_1$ | 0 | 1 | 1 | 1 | 0 | 0 |
| $S_2 \oplus R_1$ | 0 | 1 | 0 | 1 | 1 | 0 |
| $S_3 \oplus R_1$ | 1 | 0 | 1 | 0 | 1 | 0 |
| $S_4 \oplus R_1$ | 0 | 1 | 1 | 1 | 0 | 0 |
| $S_5 \oplus R_1$ | 1 | 0 | 1 | 1 | 0 | 0 |

Applying the same detection process as exemplified in the one-line case to the images of Table V, stations 301, 302 and 304 are deactivated after the first bit time and station 303 is inhibited after the fourth bit time. The state of bus 311 becomes the active image produced by station 305; this state is called the revealed image. To convert the bus state or revealed image to the received or revealed message, an inverse of the operations performed within each station must be effected. For the EXCLUSIVE OR operation, another EXCLUSIVE OR gate, having as inputs the revealed image and the random sequence frame producing the active image, yield the inverse. Thus, as depicted within receiver 321, OR gate 381, having bus 311 and the sequence $R_1$ from generator 371 as inputs, produces the actual received or revealed message. In this case, "101100" $\oplus$ "110001" = "011101."

Figure 4:
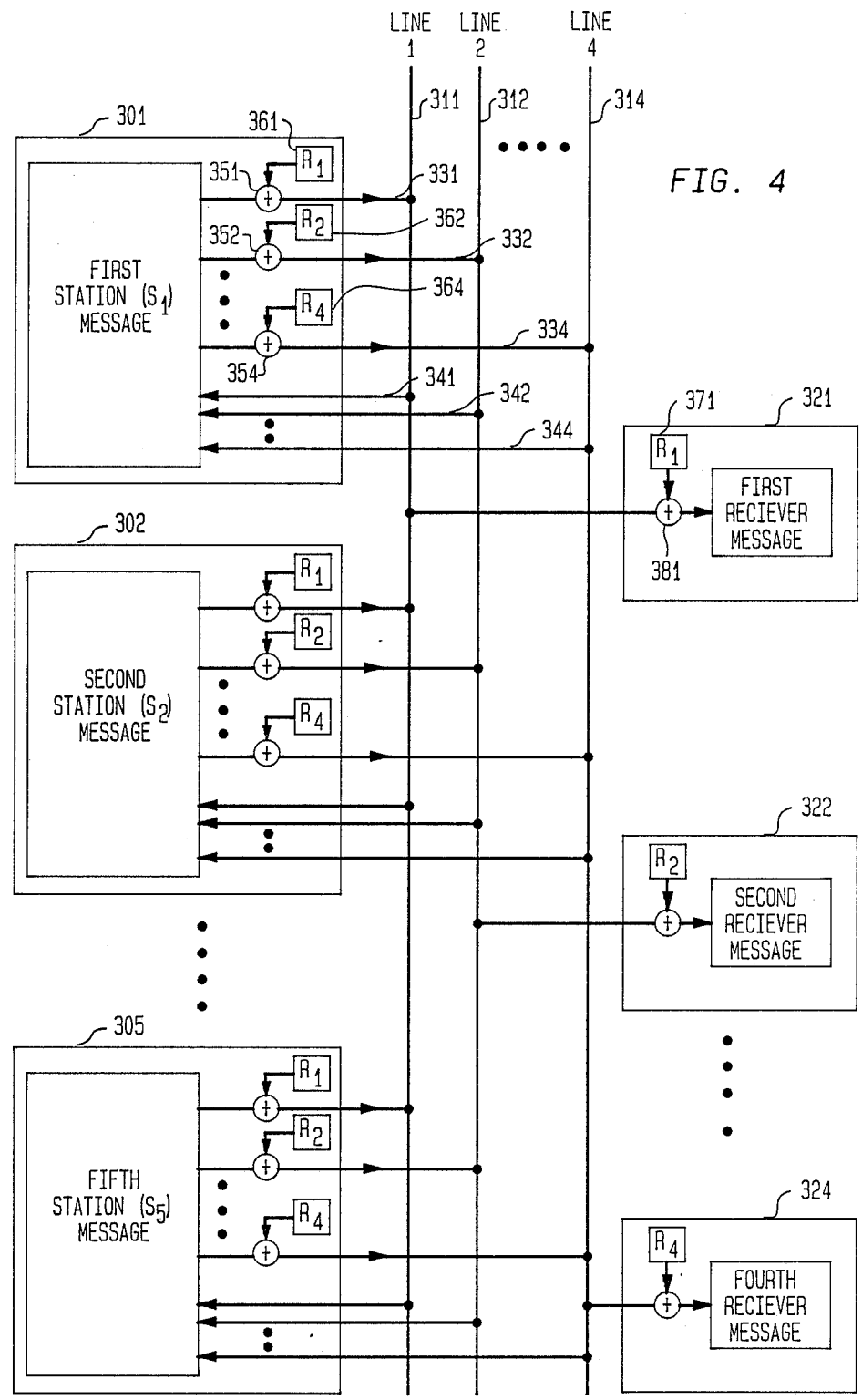
FIG. 4 is a representation of a multiple access communication system wherein L-channels interconnect numerous, geographically-dispersed stations implementing the random number generation methodology.
Figure 5:
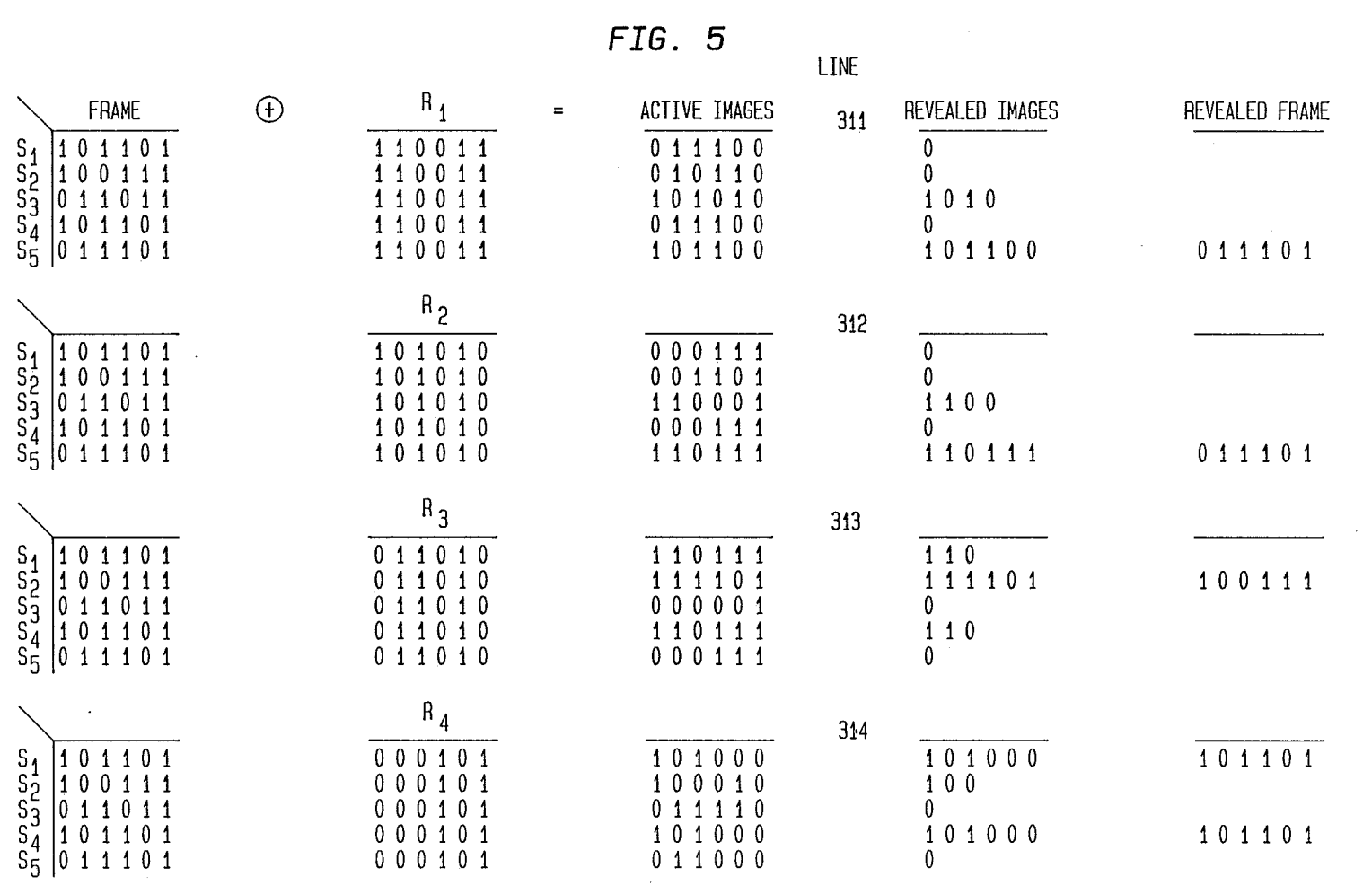

The arrangement of data shown in FIG. 5 summarizes the operation of the system of FIG. 4. The four sets of data shown as rows correspond to the four lines 311–314, respectively. The first column on the left indicates the message frames to be transmitted by stations 301–305. Basically, the contents of Table I is replicated four times—one for each set—to obtain this column. The next column lists the four sets of random frames produced by generators 361–364. Each set has identical elements, and one element from each set is the data listed in Table III. The middle column shows the active images to be supplied to each line 311–314. The first row of data from each of the horizontal sets produces the data listed in Table IV. The top five rows of the middle column are the data of Table V. The next column lists the unfolding bus state for each of the four busses, that is, the revealed images. Whenever the bit transmitted by a station differs from the state of the bus, that station deactivates. Finally, the right-hand column designates the actual or revealed frame message corresponding to the bus state after the inversion process on the revealed images is completed.

It is observed that lines 311 and 312 yield the same revealed frame although the revealed images are different. Also, line 314 broadcasts the two identical message frames from stations 301 and 305. Thus, the actual number of different message frames broadcast is three, whereas the actual number of stations active at the end of a frame is four. These results are indicative of the general performance of the static, random L-line, OR bus case.

With respect to an illustrative embodiment of circuitry realizing station 301 (and similarly stations 302-305), again it is clear the circuitry of FIG. 2 can readily be adapted. For instance, the circuitry of FIG. 2 could serve to broadcast $S_1 \oplus R_1$ if bit generator 142 is a pseudo-random number generator and bit adjuster 141 and bit inverter 143 are EXCLUSIVE OR gates. In addition, FIG. 2 could essentially be replicated three additional times to yield circuitry for transmitting $S_1 \oplus R_2$, $S_1 \oplus R_3$ and $S_1 \oplus R_4$ and for detecting the state of lines 312-314, respectively. Then, each receive buffer 181 would further include means for determining if each candidate frame was successfully broadcast on any of the lines.

4. Illustrative Embodiment of the OR, Static, Cyclic Shift L-Line Case

Figure 6:
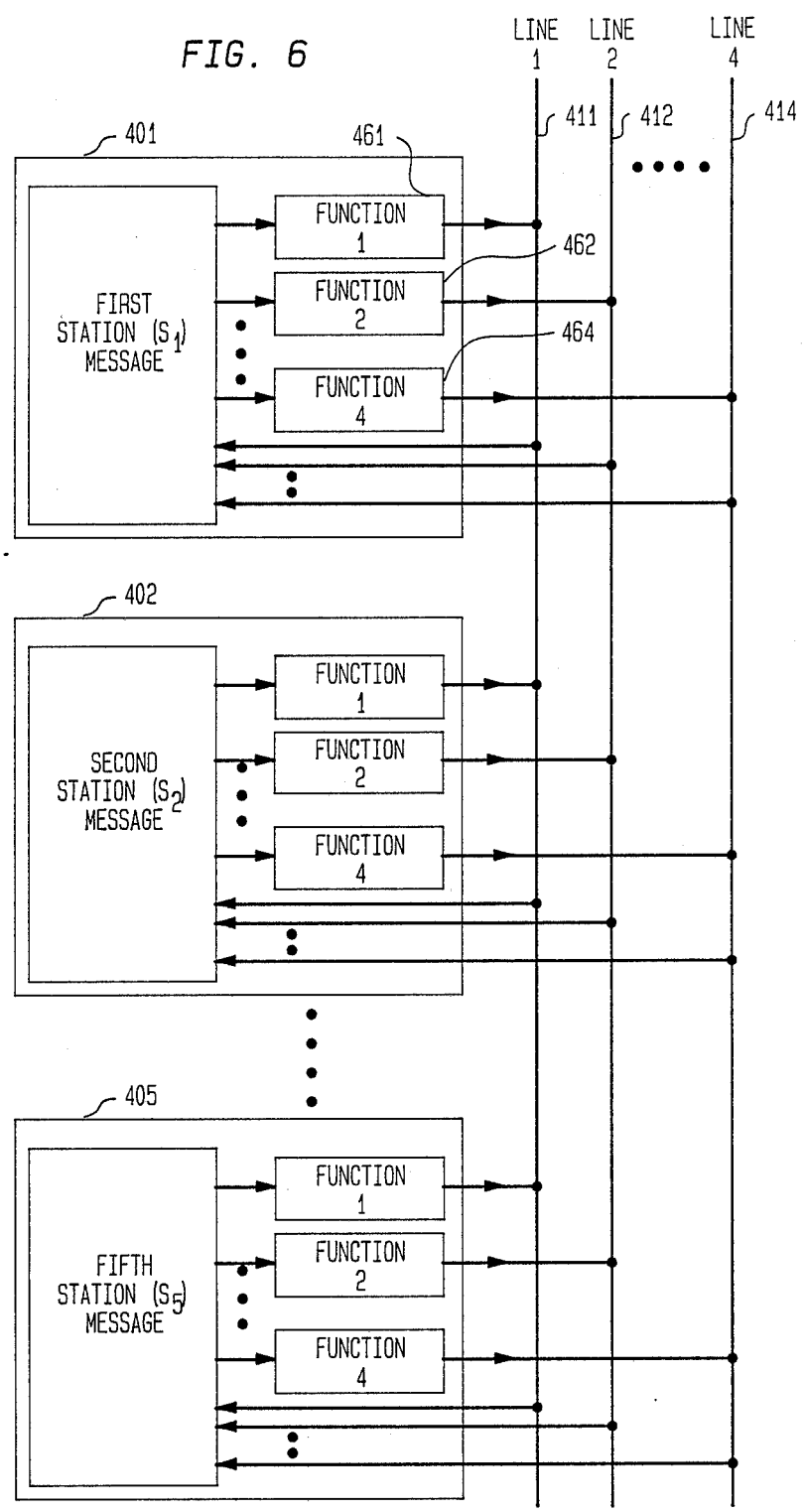
FIG. 6 is a representation of a multiple access communication system wherein L-channels interconnect numerous, geographically-dispersed stations implementing either the cyclic shift or cyclic inversion methodology.

An illustrative embodiment for this case is exemplified in block diagram form by FIG. 6. Again, five stations $S_1$-$S_5$ (elements 401-405) transmit messages over four lines 411-414.

The message frames considered for this example are again those listed in Table I. In particular, the message frame for station 401 is "101101". This frame message is the input to four separate devices 461-464 in element 401 and the outputs of devices 461-464 are linked to lines 411-414, respectively. Device 461 performs a first electrical operation, designated FUNCTION 1, on the message frame stream within station 401. Similarly, device 462 performs a second electrical operation, designated FUNCTION 2, on the frames. Similar comments also apply to the remaining electrical functions.

An example of one electrical operation is that of shifting the bits a fixed number of positions in the frame. For instance, FUNCTION 2 may designate the operation of shifting each bit by one bit position to the right. Similarly, FUNCTION 4 may call for the right-shifting by three bit positions. With this particular operation definition, FUNCTION 1 performs no shifts.

Figure 7:
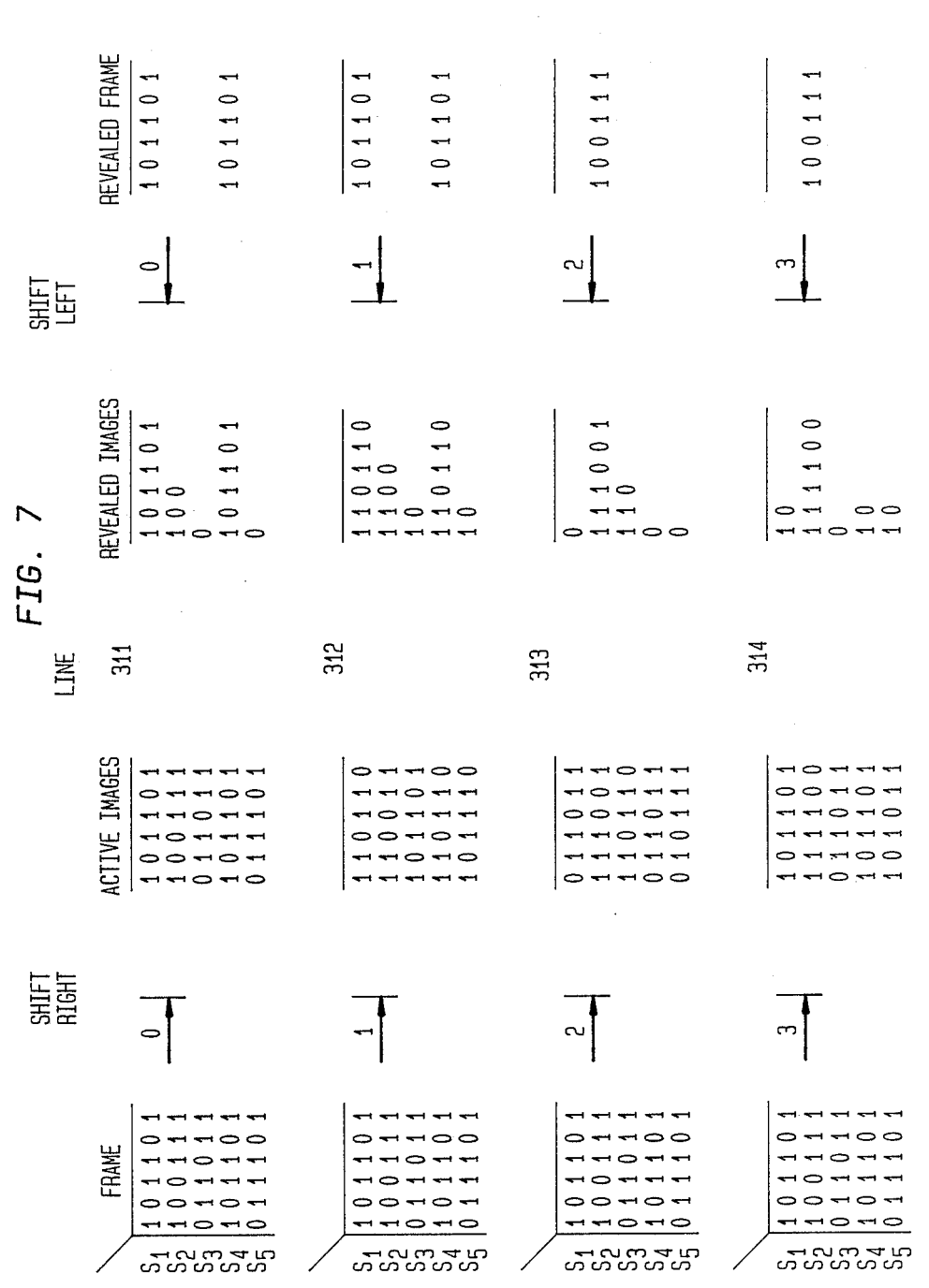

The arrangement of data shown in FIG. 7 summarizes the processed frames for the system of FIG. 6. The data arrangement is similar to that discussed with respect to FIG. 5. The four horizontal sets of data correspond to the four lines 411-414, respectively. The left-hand column is a four-fold replication of the data in Table I. The next column shows the active images that result from the right-shift operation. In the first set of data, no shift occurs. In the second set, a single right shift occurs, with the right-most bit in the frame being transferred to the left-most bit. The next group of five frames shows a right shift of two bit positions and, finally, the last five frames have bits right-shifted three positions. The third column of data depicts the unfolding state of the bus and any station that remains active for the duration of the frame generates the bus state. Any fully transmitted message provides the revealed images of the corresponding station message frame. Finally, the last column depicts the effects of left shift operations on the revealed messages. The number of left shifts on any line equals the number of right shifts used to create the active images for that line.

It is observed that lines 411 and 412 each yield the same revealed message frame and, moreover, the same two stations ($S_1$ and $S_4$) produced these frames. Also, lines 413 and 414 yield the message broadcast by station 402. Thus, the actual number of different frames broadcast is two, and the actual number of stations active at the end of this frame is three. These results are representative of the general performance for this case.

Regarding an illustrative embodiment in more detailed form, the circuitry of FIG. 2 may be used as a basic module. For instance, the circuitry of FIG. 2 could transmit a right-shifted bit if bit generator 142 controls adjuster 141 in its right-shift operation and inverter 143 in its left-shift operation. The circuitry of FIG. 2 could be repeated three more times to yield circuitry for performing the other required shifts. Also, a means for monitoring the four paralleled sections is required to determine if a candidate frame has been broadcast.

5. Illustrative Embodiment of the OR, Static, Cyclic Inversion L-Line Case

The general block diagram of FIG. 6 is also representative of this case. The devices exemplified by FUNCTION elements 461-464 now perform a so-called cyclic inversion operation as discussed below.

A new set of message frames, having a frame length of four bits, is considered for this illustrative embodiment. The particular frames under study are depicted in FIG. 8, namely, as the top five rows in the left-hand column. As before, these five rows are replicated three more times to produce the set of data to be broadcast over lines 412-414, respectively.

Each device 461-464 in FIG. 6 performs an electrical mapping operation to convert the input frames to active image frames. Thus, FUNCTION i, i=1,2,3 or 4, represents the mapping rule. To apply this rule, each possible message frame is first evaluated in terms of its decimal values.

The decimal representation of all possible combinations of bits in a frame comprises the set of integers 0,1,2, . . . ,15. This set is mapped as follows for the individual lines 411-414:

TABLE VI

| | |
|---|---|
| original: | 0, 1, 2, 3, 4, 5, 6, 7, 8, 9, 10, 11, 12, 13, 14, 15 |
| FUNCTION 1 | line 411 |
| mapping: | 12, 13, 14, 15, 11, 10, 9, 8, 7, 6, 5, 4, 3, 2, 1, 0 |
| FUNCTION 2 | line 412 |
| mapping: | 3, 2, 1, 0, 12, 13, 14, 15, 11, 10, 9, 8, 7, 6, 5, 4 |
| FUNCTION 3 | line 413 |
| mapping: | 7, 6, 5, 4, 3, 2, 1, 0, 12, 13, 14, 15, 11, 10, 9, 8 |
| FUNCTION 4 | line 414 |
| mapping: | 11, 10, 9, 8, 7, 6, 5, 4, 3, 2, 1, 0, 12, 13, 14, 15 |

An example of the mapping rules of Table VI applied to the frames broadcast over line 411 is considered with respect to station $S_1$. The frame produced by $S_1$ is "0001", and this has a decimal equivalent of 1; hence, the frame is mapped into decimal 13 or binary "1101". Similarly, station $S_2$ emits a binary "1110" since the frame to be converted is a decimal 2. The active images for all the input message frames are shown in the second column in FIG. 8.

The set of fully revealed images corresponding to the stations that remain active for the duration of the frame is shown by the third column of FIG. 8. Finally, the right-hand column shows the actual revealed messages. A revealed message is generated from a fully revealed image by applying the inverse mapping operation. For instance, with respect to line 411, an active image of "1110" corresponds to "0010" according to the mapping rules of Table VI.

It is observed that the revealed images on lines 411, 412 and 413 are identical and correspond to a decimal 14. However, each of the revealed frames is unique and the frames correspond, respectively, to decimal 2, decimal 6 and decimal 10. In this case, four different messages transmitted by four different stations are revealed over four lines 411–414.

For a more detailed illustrative embodiment, the circuitry of FIG. 2 is representative of one of four essentially identical sections. Bit adjuster 141 and bit inverter 143 in each section implement the cyclic mapping function and its inverse as set forth in Table VI. Again, all four sections are coupled with means for determining if the candidate frame from the station has been successfully transmitted.

6. Illustrative Embodiment of the OR, Static, Linear Transformation L-Line Case The general block diagram of FIG. 6 is also representative of this case. The devices exemplified by FUNCTION elements 461–464 now perform a so-called linear transformation, as discussed below.

Figure 9:
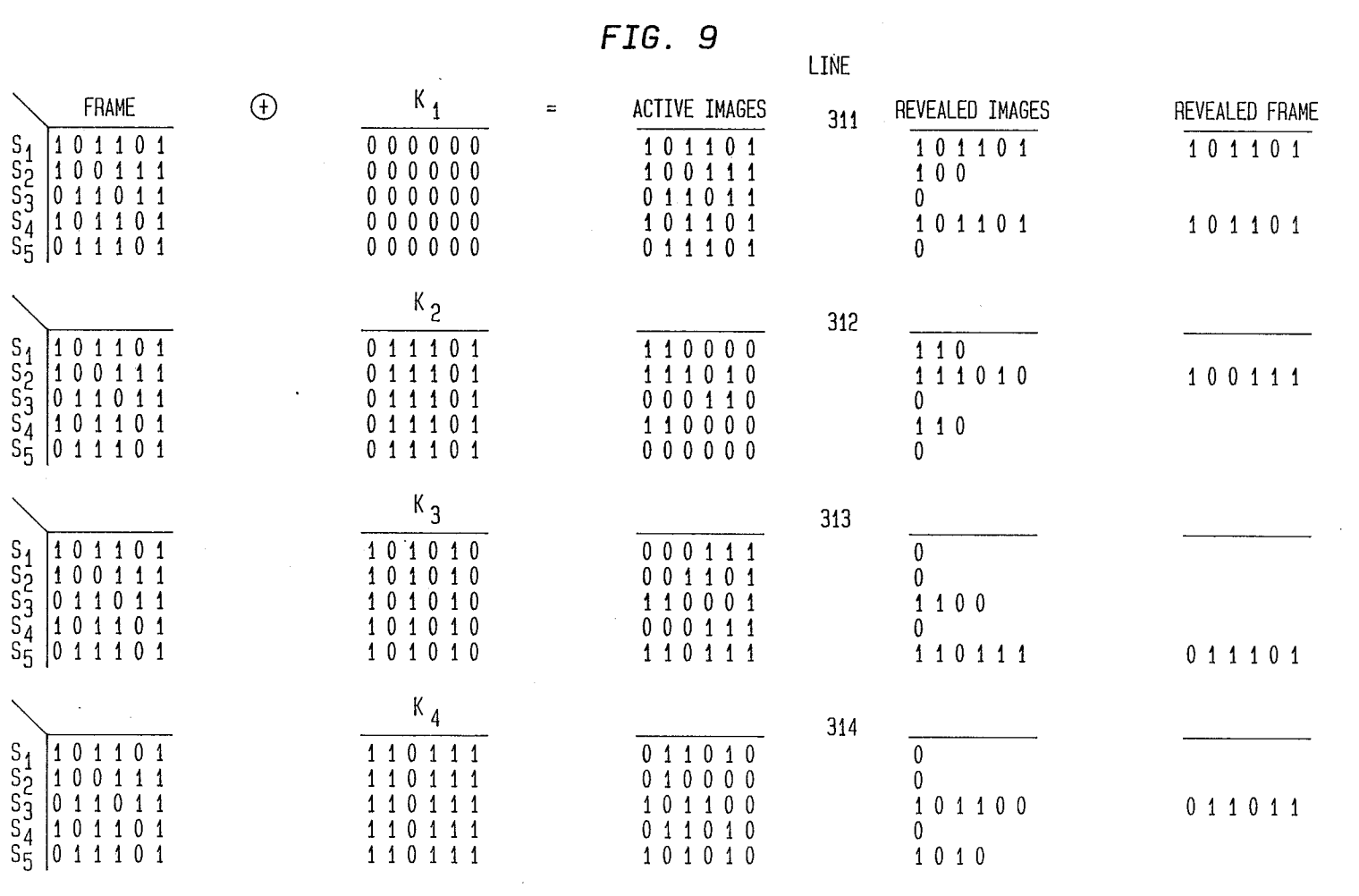

The message frames considered for this example are those listed previously in Table I. In this case, the processing operation performed by elements 461–464 is a linear transformation. A summary of the results of the processing operation is shown in FIG. 9; the format of FIG. 9 is substantially the same as FIG. 5. The main difference resides is the change in arriving at the data of the second column, namely, the binary data under legends $R_1$, $R_2$, $R_3$ and $R_4$ in FIG. 5 has been replaced with new binary data and the legends have been modified to read $K_1$, $K_2$, $K_3$ and $K_4$ in FIG. 9 to highlight the new data. What remains is an explanation as to method of generating the data for each $K_i$, $i=1$ to 4. The procedure is discussed initially as it pertains to FIG. 9; the general procedure is then presented.

For the case of $L=4$ lines, each of the four lines is assigned a corresponding binary number. For instance, line 1 (line 411 in FIG. 6) is assigned '00', line 2 is '01', line 3 is '10' and line 4 is '11'. For any line, the assiqned binary number is of the form '$b_0b_1$'. Now, a linear transformation f is defined by $$f(b_0b_1) = \begin{cases} \text{`}0\hat{b}_0\text{'} & \text{for an even number of 1's in `}b_0b_1\text{'}, \\ \text{`}1\hat{b}_0\text{'} & \text{for an odd number of 1's in `}b_0b_1\text{'}, \\ \text{where } \hat{b}_0 \text{ is the complement of } b_0. \end{cases}$$

Thus, for line 1, $f(00)=$'00'; for line 2, $f(01)=$'11'; for line 3, $f(10)=$'10'; and $f(11)=$'01'.

To obtain $K_i$, the following concatenation is formed for each i corresponding to line i:

$$K_i = \text{`}b_0B_1\text{'} \, V f(b_0b_1) \, V f(f(b_0b_1)),$$

where V designates concatenation.

For example, to obtain $K_2$ for line 2, the associated binary number is '01'. From above, $f(01)=$'11'. Finally $f(f(01))=f(11)=$'01'. Thus, $K_2=011101$; this binary number is shown under the $K_2$ legend in FIG. 9. Other $K_i$ data is generated similarly.

For the general case of L lines, F bits in a frame message and a m bit representation for $K_i$, $m \leq F$, the following procedure applies. For each $i, i=1,2,\ldots,L$, there corresponds a constant binary number $K_i$. Each line is assigned a binary number '$b_0b_1\ldots b_{L-1}$'$=b$ and a linear transformation f is defined by $$f(b_0b_1\ldots b_{N-1}) = \begin{cases} \text{`}0\hat{b}_0\hat{b}_1\ldots \hat{b}_{N-2}\text{'} & \text{for an even number of 1's in } b. \\ \text{`}1\hat{b}_0\hat{b}_1\ldots \hat{b}_{N-2}\text{'} & \text{for an odd number of 1's in } b. \end{cases}$$

where $N=\log_2 L$. To obtain $K_i$, the concatenation is formed:

$K_i = \text{`}b_0b_1\ldots b_{N-1}\text{'} \, V f(b_0b_1\ldots b_{N-1}) \ldots V f^Q(b_0b_1\ldots b_{N-1})$, where $Q=(m/\log_2 L)-1$ and, for example, $f^2(b_0b_1\ldots b_{N-1})=f(f(b_0b_1\ldots b_{N-1}))$, $f^3(b_0b_1\ldots b_{N-1})=f(f(f(b_0b_1\ldots b_{N-1})))$, and so forth.

For every candidate message, its first m-bits are exclusively-ORed with the $K_i$ for the particular line i to generate the active image placed on that line.

In the example summarized in FIG. 9, $L=4$, $F=6$ and $m=6$; accordingly $Q=2$ and $N=2$. It is to be noted that generally, $m \leq F$, so it is possible, for instance, that $m=4$. Then $Q=1$, and another possible set of $K_i$ values would be: $K_1=0000$; $K_2=0111$; $K_3=1010$ and $K_4=1101$.

Similar procedures obtain for L not a power of two.

In terms of circuitry, the arrangement of FIG. 2 is representative of one of four essentially identical sections. Bit adjuster 141 and bit inverter 143 in each section implement the linear transformation mapping and its inverse, respectively. Again, all sections are coupled with means for determining if the candidate frame from the station has been successfully transmitted.

It is to be understood that the above-identified arrangements are simply illustrative of the application of the principles in accordance with the present invention. Other arrangements may be readily devised by those skilled in the art which embody the principles of the present invention and fall within its spirit and scope.

What is claimed is:

1. A method for transmitting at least one first message over a first bus and at least one second message over a second bus, each said bus interconnecting a plurality of synchronized stations, said method comprising the steps of broadcasting the bits generated by each of the stations serially over said first bus and the complement of said bits serially over said second bus, and wherein the state of each said bus during each bit interval is the OR of the bits broadcast by the stations, deactivating broadcasting over said first bus by any of the stations whenever its most recently broadcast bit differs from the state of said first bus, and deactivating broadcasting over said second bus by any of the stations whenever its most recently broadcast complemented bit differs from the state of said second bus, wherein each said message is comprised of the bits broadcast on its respective bus.

2. A method for transmitting a plurality of messages in each time period over a set of buses interconnecting numerous synchronized stations, each of said messages comprising the series of bits transmitted by the corresponding ones of said buses in said period, said method comprising the steps of supplying to each of said stations a first set of bit sequences corresponding to the number of said buses, generating for each of said stations a second set of bit sequences by serially performing EXCLUSIVE-OR operations on the bits of a message generated by each of said stations and said first set of sequences, serially broadcasting the bits from each sequence in said second set over corresponding ones of said buses, and wherein the state of each of said buses during each bit interval is the OR of the bits from said second set as broadcast by the stations, deactivating broadcasting over any of said buses by any of said stations during said period whenever its most recently broadcast bit differs from the state of said corresponding one of said buses, and generating each of said messages by performing EXCLUSIVE-OR operations on the bits broadcast on each said corresponding bus during said period with said sequences in said first set.

3. The method as recited in claim 2 wherein said step of supplying includes the step of providing a set of random bit sequences to serve as said first set.

4. The method as recited in claim 2 wherein said step of supplying includes the step of providing a set of cyclicly shifted bit sequences to serve as said first set.

5. The method as recited in claim 2 wherein said step of supplying includes the step of providing a set of cyclicly inverted bit sequences to serve as said first set.

6. The method as recited in claim 2 wherein said step of supplying includes the step of providing a set of linearly transformed bit sequences to serve as said first set.

7. Circuitry for broadcasting a first message and a second message to a plurality of synchronized stations, said circuitry comprising first and second OR buses interconnecting the stations, means for generating candidate message information bits within each of the stations, means for broadcasting said candidate message information bits serially over said first bus and for broadcasting the complement of said candidate message information bits serially over said second bus, and wherein the state of each said bus during each bit interval is the OR of the bits broadcast by the stations, means for deactivating broadcasting over said first bus by any of the stations whenever its most recently broadcast bit differs from the state of said first bus, and means for deactivating broadcasting over said second bus by any of the stations whenever its most recently broadcast bit differs from the state of said second bus, wherein each said message is comprised of the bits broadcast on its respective bus.

8. Circuitry for broadcasting a plurality of messages in each time period over a set of buses interconnecting numerous synchronized stations, each of said messages comprising the series of bits transmitted by the corresponding ones of said buses in said period, said circuitry comprising means for providing to each of the stations a first set of bit sequences corresponding to the number of said buses, means for generating for each of said stations a second set of bit sequences by serially performing EXCLUSIVE-OR operations on the bits of a message generated by each of said stations and said first set of sequences, means for serially broadcasting the bits from each sequence in said second set over corresponding ones of said buses, and wherein the state of each of said buses during each bit interval is the OR of the bits from said second set as broadcast by the stations, means for deactivating broadcasting over any of said stations during said period whenever its most recently broadcast bit differs from the state of said corresponding one of said buses, and means for generating each of said messages by performing EXCLUSIVE-OR operations on the bits broadcast on each said corresponding bus during said period with said sequences in said first set.

* * * * *

UNITED STATES PATENT AND TRADEMARK OFFICE
CERTIFICATE OF CORRECTION

PATENT NO. : 4,768,189

DATED : August 30, 1988

INVENTOR(S) : Bhaskarpillai Gopinath
Shuo-Yen Robert Li

It is certified that error appears in the above-identified patent and that said Letters Patent is hereby corrected as shown below:

Column 6, line 47, "$y_2$" should read --$\hat{y}_2$--

Column 11, line 47, " '$0\hat{b}_0$' " should read --'$0b_0$'--

Column 11, line 57, " '$b_0 B1$' " should read --'$b_0 b_1$'--

Signed and Sealed this

Fourteenth Day of July, 1992

Attest:

DOUGLAS B. COMER

*Attesting Officer*      *Acting Commissioner of Patents and Trademarks*